(Model.)

J. SMITH.
NUT LOCKING SPRING WASHER.

No. 314,888. Patented Mar. 31, 1885.

Witnesses.
J. W. Cook
L. P. Blanchard

Inventor.
John Smith
by James J. Kay
Attorney

UNITED STATES PATENT OFFICE.

JOHN SMITH, OF VERONA, ASSIGNOR OF TWO-THIRDS TO F. G. KAY AND JAMES I. KAY, OF ALLEGHENY CITY, PENNSYLVANIA.

NUT-LOCKING SPRING-WASHER.

SPECIFICATION forming part of Letters Patent No. 314,888, dated March 31, 1885.

Application filed April 22, 1884. (Model.)

*To all whom it may concern:*

Be it known that I, JOHN SMITH, of Verona, in the county of Allegheny and State of Pennsylvania, have invented a new and useful Improvement in Nut-Locking Spring-Washers; and I do hereby declare the following to be a full, clear, and exact description thereof.

My invention relates to spring-washers employed with the nuts and bolts of rail and other joints to allow for the spreading of the joints under heavy strain, and hold the joints tight when relieved of such strain, and to prevent the turning or loosening of the nut on account of the jar on the rails, its object being to form a cheap and efficient nut-locking spring-washer which can be made at small cost, as it can be cut, punched, and stamped at one operation, and requires no special finishing.

It consists, essentially, in combining with the nut a plate-metal spring-washer curved or bent in two opposite directions on central lines extending at right angles to each other, so that two points or edges bear against the fish-plate, and thus hold the washer from turning, and form an efficient spring, and the opposite face is bent up to press against the edges of the nut, forming a curved seat for the reception of the nut, and catching along the edges of the sides or faces of the nut and holding it.

To enable others skilled in the art to make and use my invention, I will describe its construction and operation, referring to the accompanying drawings, in which—

Figure 1:
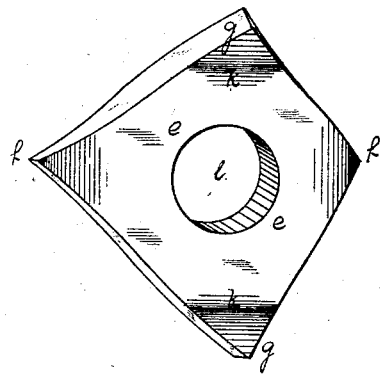
Figure 2:
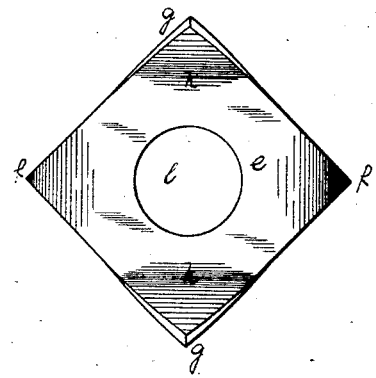
Figure 3:
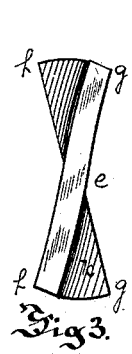
Figures 4, 5:
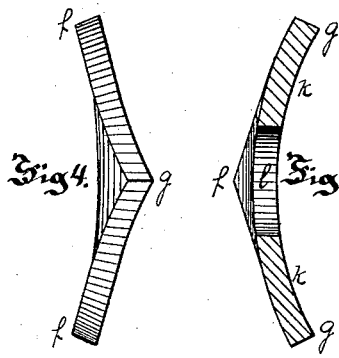
Figure 6:
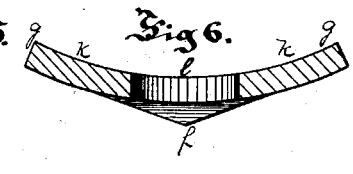
Figure 7:
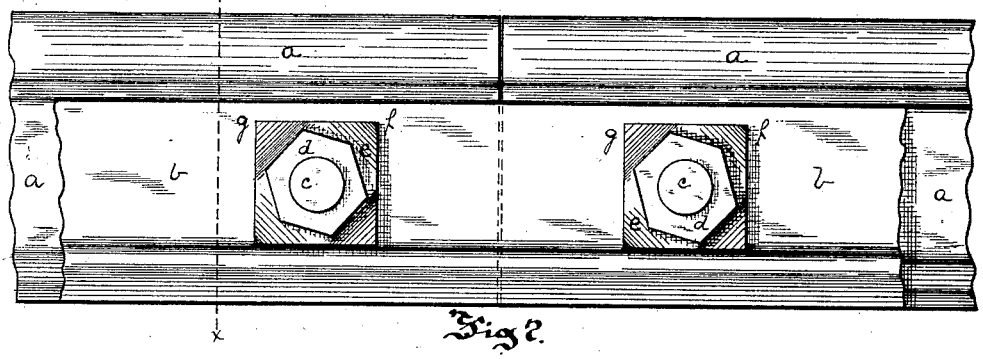
Figure 8:
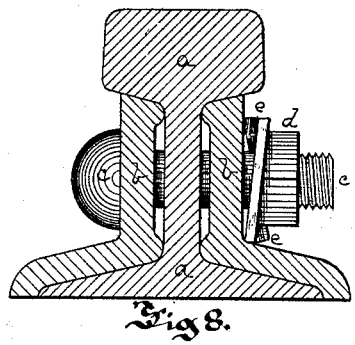

Figure 1 is a perspective view of my improved washer. Fig. 2 is a face view. Figs. 3 and 4 are edge views. Fig. 5 is a vertical central section. Fig. 6 is a horizontal central section. Fig. 7 is a face view of a rail-joint, illustrating its operation; and Fig. 8 is a cross-section on the line $x\ x$, Fig. 7.

Like letters of reference indicate like parts in each.

The rails $a$, fish-plates $b$, bolts $c$, and nuts $d$ are of the usual or any suitable construction. The washer $e$ is formed of plate metal, a steel with spring temper being suitable for this purpose. It is preferably square, as shown, but may be circular or of other angular shape. It is curved in two opposite directions on lines extending at right angles to each other through the center of the washer, the lines extending from corner to corner in the square washer, thus forming a continuous curve on each face from its opposite corners through the center thereof, and the two diagonal corners $f\ f$ being curved backward to rest against the fish-plate or other object to be held, and bite into it and hold against it, thus forming a spring-washer, as hereinafter described, and the other corners, $g\ g$, being curved outward, so as to form the rising faces $k$, to press upwardly against the edges of the nut and hold by their friction, and also to form a curved seat within which the nut rests, the curved faces of the washer pressing against the edges of two sides or faces of the nut. As the edges or corners which are curved back against the fish-plate hold the central portion of the washer, through which the bolt passes and against which the nut presses, up from the fish-plate, the washer has a strong spring, it being nearly impossible to press the body of a heavy washer tight against the fish-plate by an ordinary wrench, and sufficient spring being thus obtained to allow for the spreading of the rails and fish-plates under heavy strains and to hold the joint tight when relieved of the strain, while the spring presses the washer against the nut and forms a tight hold by friction alone. As the opposite edges of the washer are curved forward at right angles to the edges curved backward, they are not affected by the flattening of this portion of the washer, and always press firmly against the edges of the nut. The bolt-hole $l$ is made sufficiently large to allow of the flattening of the washer without binding on the bolt. The washer is preferably made larger than the nut, so that its edges do not catch against the nut, and its lower edges rest against the flange of the fish-plate or rail, or an extension of any other device connected, the washer being thus held from turning by this flange. This is not necessary, however, as the corners will bite into the fish-plate and hold firmly.

In making a joint the washer is first placed over the bolt against the fish-plate or other part to be connected, and the nut then screwed on, the nut traveling up the rising faces of the curved seat, and considerable force being required to screw it up to place, as in so doing the washer is compressed and flattened. When screwed to place, it is firmly held by the upward pressure of the washer against its edges and by the outwardly-extending faces pressing against the edges of its sides or faces, the nut resting within the curved seat on the outer surface of the washer, and a strong hold on the nut being obtained by the washer, so that it cannot be loosened by the jarring or vibration of the rails, a heavy force being required to unscrew it. As the nut is screwed to place the two corners or edges resting on the fish-plate balance the washer, so that the pressure against the nut is even on both sides thereof, the washer centering itself, as it were, and exerting an even pressure upwardly against the nut, whether the threads of the bolt and nut be cut true or not, and this even pressure of the washer causes a heavy binding-pressure of the threads of the nut against those of the bolt around the entire surface of the threads, instead of only at one point, as is often the case in spring-washers, thus obtaining a very great frictional hold. In case of sufficient strain coming on the rail-joint to cause it to spread, the washer will spring or give sufficiently to prevent the breaking of the joint or stripping of the threads of the bolt or nut, and when relieved of the strain will spring back to place and hold the joint tight.

The washer can be rapidly made at slight cost, being cut from strips of steel plate of the proper width and bent to shape and punched at one operation, and requiring no further finishing.

Before my invention nut-locking devices have been formed of a washer having two corners turned up to retain the nut, the washer being otherwise unelastic, and having two corners turned down and fitting into seats in the bar or plate; but my invention differs materially from this washer, as it is curved in two opposite directions on central lines at right angles to each other, thus forming a continuous curve on each face from its opposite corners through the center thereof, and hence the central part of the washer is supported above the plate and forms a strong spring, to allow of the spreading of the joint or parts connected and hold the joint tight when relieved of the strain; and it holds the nut by the pressure of the curved or rising faces on the upper surface of the washer upwardly against the nut, as well as holding along the edges thereof, the upper face of the washer forming a curved seat for the nut.

What I claim as my invention, and desire to secure by Letters Patent, is—

In nut-locks, the combination, with the bolt and nut, of the plate-metal spring-washer curved in opposite directions on central lines at right angles to each other, substantially as and for the purposes set forth.

In testimony whereof I, the said JOHN SMITH, have hereunto set my hand.

JOHN SMITH.

Witnesses:
 F. G. KAY,
 JAMES I. KAY.